June 30, 1936. M. L. FYKSE 2,046,306
BRAKE AND CLUTCH BAND
Filed July 14, 1933 2 Sheets-Sheet 1

Mitchell L. Fykse,
INVENTOR.

BY Hoar, Ruhloff & Arnaud
ATTORNEYS.

June 30, 1936.  M. L. FYKSE  2,046,306
BRAKE AND CLUTCH BAND
Filed July 14, 1933  2 Sheets-Sheet 2

Mitchell L. Fykse,
INVENTOR.

BY *[signature]*
ATTORNEYS.

Patented June 30, 1936

2,046,306

UNITED STATES PATENT OFFICE 2,046,306

BRAKE AND CLUTCH BAND

Mitchell L. Fykse, South Milwaukee, Wis., assignor to Bucyrus-Erie Company, South Milwaukee, Wis., a corporation of Delaware Application July 14, 1933, Serial No. 680,359

9 Claims. (Cl. 188—259)

My invention relates to new and useful improvements in "Brake and clutch bands".

Throughout the following description, and in the claims, I shall use the word "brake-band" to describe my invention, but it is to be understood that my invention is equally applicable to clutch bands and accordingly the words "brake-band" is to be taken to include clutch bands as well as brake bands.

My invention particularly relates to that type of brake-band which is made in two sections, each substantially semi-circular, joined together by an adjustable joint. Having the brake-band adjustable at that point possesses certain advantages well-known in the art, which need not be detailed here.

But it also possesses the following disadvantages. Due to buckling at the joint, the band does not release uniformly. The adjusting bolt is subject to bending stresses as well as to tension, and hence has to be made more heavy than would be the case if it were subject only to tension. The bearings for the adjusting bolt tend to bind on the bolt, as the bolt changes its orientation during adjustment. The two sections of the band are apt to become slightly offset, rather than to lie in the same circular arc. The lining of the band cannot extend to the end of the sections, for it must be cut away to make room for the splice and this decreases the arc of contact.

Accordingly one of the objects of my invention is to secure the advantages of this type of band, without the disadvantages above enumerated, and also to secure the additional advantages in this connection, which will be mentioned as the description progresses.

In order to provide for the speedy and somewhat uniform release of the band, when released, it is a common expedient to secure the band to the channels or bars by means of tension springs, which tend to pull the band out of engagement with the drum when released. Accordingly my invention has the further object of eliminating these channels or bars, providing a standard unit which will suit all brakes irrespective of width of band or diameter of housing, reducing weight and cost, facilitating the application and removal of the band for repairs by building the band and the release mechanism as one self-containing unit and providing much more uniform release all around the band than has heretofore been possible.

In the matter of uniform release, it is to be noticed that my splice mechanism and my release-rollers, cooperate to this end.

In addition to my principal object, I have worked out a number of novel and useful details, which will be readily evident as the description progresses.

My invention consists in the novel parts, and in the combinations and arrangements thereof, which are defined in the appended claims; and of which one embodiment is exemplified in the accompanying drawings, which are hereinafter particularly described and explained.

Throughout the description, the same reference number is applied to the same member or to similar members.

Figure 1:
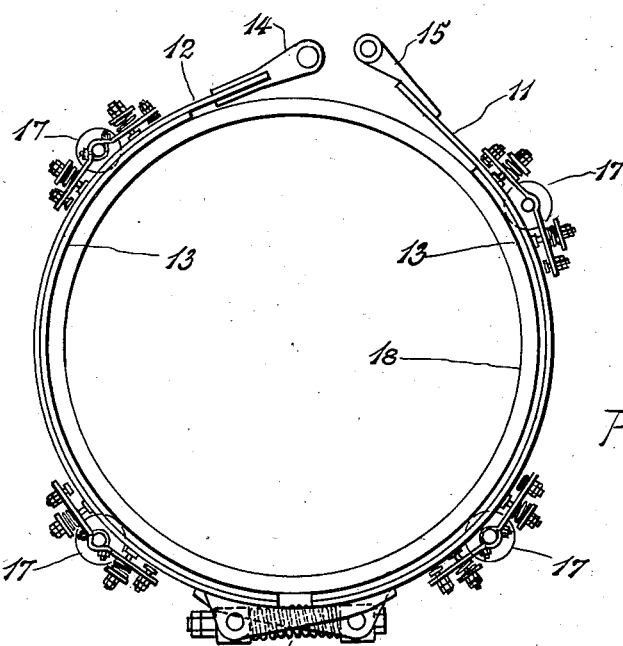
Figure 1 is a side view of my entire band in place upon a brake drum.

Referring to Figure 1, it will be seen that 11 and 12 are two sections of a brake-band, having a lining 13, a dead-end 14, a live-end 15, a splice 16 and release rollers 17. It is shown positioned about a brake drum 18.

Figure 2:
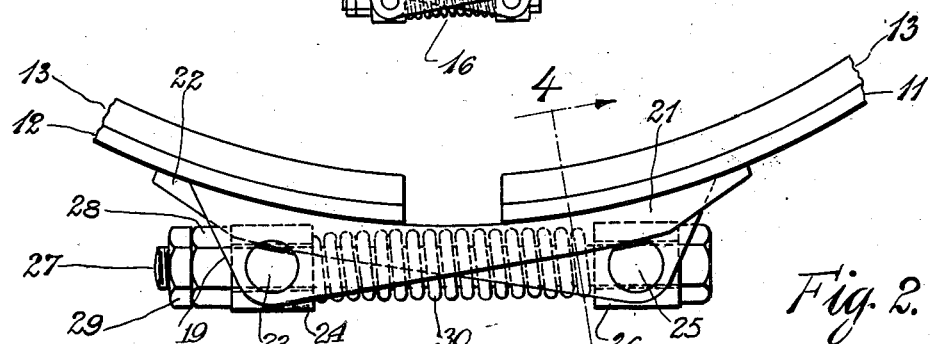
Figure 2 is the same view of the splice of Figure 1, enlarged.
Figure 3:
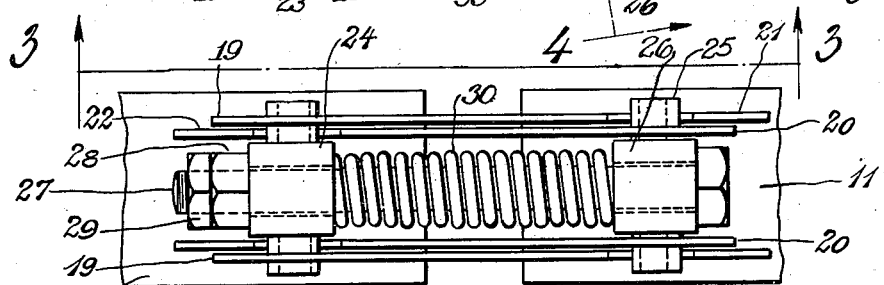
Figure 3 is a view of the splice of Figure 2 taken along the lines 3—3 of Figure 2.
Figure 4:
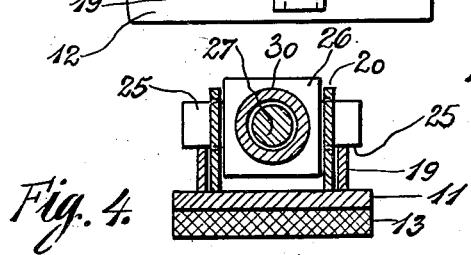
Figure 4 is a sectional view of the splice of Figure 2 taken along the lines 4—4 of Figure 2.

Referring now to Figures 2 and 3, the splice 16 of Figure 1 will be explained in detail. Attached, in any appropriate manner, to the outside of section 12 of the band are two flanges 19. Attached, in any appropriate manner, to the outside of section 11 of the band are two flanges 20. Each of these pairs of flanges projects over the section of band to which it is not attached. This projecting portion of flanges 19 is shaped at 21 to conform to the outer surface of section 11 of the band. This projecting portion of flanges 20 is shaped at 22 to conform to the outer surface of section 12 of the band. This shaping insures that the two sections of band, regardless how adjusted, will always lie in arcs of the same circle.

Journaled in flanges 19 by means of trunnions 23 is a bearing 24. Journaled in flanges 20 by means of trunnions 25 is a bearing 26. Through holes in these bearings is passed an adjusting bolt 27 having a nut 28 and a lock nut 29. Around the bolt, between the two bearings, and tending to hold them apart by pressing against them, is a compression spring 30.

In Figure 2 a portion of each trunnion 23 and 25 is shown cut away to provide clearance for the free end of the opposing flange. The trunnions constrain these free ends to contact with the outer surface of the brake-band as already described.

Figure 5:
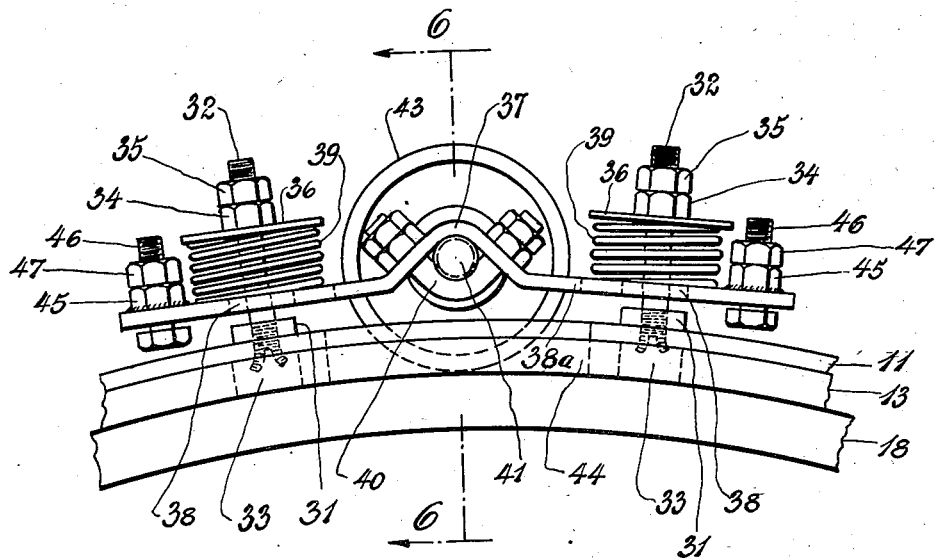
Figure 5 is a side view of one of the release rollers of Figure 1, unlarged.
Figure 6:
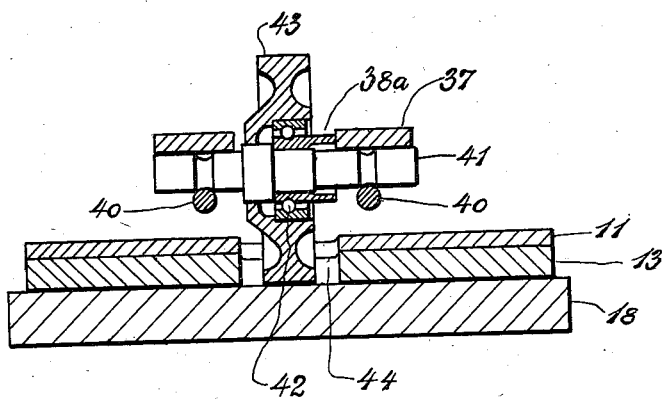
Figure 6 is a view of the roller of Figure 5 taken along the lines 6—6 of Figure 5.

Referring now to Figures 5 and 6, one of the rollers 17 will now be explained in detail. The band 11 is reinforced by bosses 31, through which and through the band are screwed split bolts 32.

These bolts are secured in place by driving a cold-chisel into their split portion, which extends into a recess 33 in the brake lining. Each of these bolts is provided with an adjusting nut 34 and a lock nut 35, which bear on a washer 36. A piece of strap iron 37 is recessed at 38 for the passage of these nuts, and is constrained toward the brake-band by means of springs 39.

U-bolts 40 secure an axle 41 to this piece of strap iron. Mounted on this axle by means of ball-bearings 42 is a wheel 43 which passes through a recess 38a, in the piece of strap iron 37, and through a recess 44 in the brake-band 11 and the lining 13, to bear upon the brake drum 18. Welded to each end of the piece of strap iron 37 is a nut 45, through which may be screwed a bolt 46, secured by lock nut 47. By adjusting these bolts 46, the distance by which the wheel 43 can penetrate through the recess 44, and consequently the distance by which the wheel can thereby lift the brake lining 13 out of contact with the brake drum 18, can be definitely and minutely limited.

It will be seen that by the cooperation of my splice and my rollers, my band will at all times be kept in the arc of a perfect circle, whether applied or released, and may be readily adjusted and replaced, all parts being readily accessible.

The operation of my invention, and the cooperation of its various elements, are as follows: By virtue of the constraining of projecting portions 21 and 22 between the band and trunnions 25 and 23, any adjustment of bolt 27 still leaves the splice-joint at this point constrained against buckling either towards or away from the drum 18, when the brake is released. Also, when the brake is released, the rollers 17 free the band uniformly throughout its length. Either of these features alone would fail to accomplish this objective of a uniform release, and thus these features are seen to cooperate to this end.

Having now described and illustrated one form of my invention, I wish it to be understood that my invention is not to be limited to the specific form or arrangement of parts hereinbefore described, except in so far as such limitations are specified in the appended claims.

I claim:

1. In a brake-band, the combination of: two band-sections; linings therefor; an arcuate guide carried by one section; an arcuate guided portion carried by the other section, and coacting with the arcuate guide of the first section; means carried by the first section, contacting the guided portion of the second section, and constraining it against material departure from the guide of the first section; means for adjusting the gap between the two sections; means carried by each section, and bearing against the brake drum (which cooperates with the brake-band), and adjustable to cause a desired degree of clearance of the band when released; the whole being so contrived as to constrain the band to release uniformly.

2. In a brake-band, the combination of: two band-sections; four flanges, two carried by each section, and overlapping the other section, the overlapping portion being shaped to conform to the shape of the section overlapped; two bolt-bearings, each having trunnions, journaled by means of its trunnions in one pair of flanges, each trunnion bearing upon the overlapping portion of one of the opposed flanges to hold it in engagement with the brake-section overlapped; an adjusting bolt, to hold the bolt-bearings together; and a spring, to bias the bolt bearings apart.

3. In a brake-band, the combination of: two band-sections; four flanges, two carried by each section, and overlapping the other section, the overlapping portion being shaped to conform to the shape of the section overlapped; two bolt-bearings, each having trunnions, journaled by means of its trunnions in one pair of flanges, each trunnion bearing upon the overlapping portion of one of the opposed flanges to hold it in engagement with the brake-section overlapped; an adjusting bolt, to hold the bolt-bearings together; a spring, to bias the bolt bearings apart; and a plurality of rollers, spaced substantially equally about the band, each roller having associated therewith spring means carried by one of the band sections, which spring means tends to bias the roller into contact with the cooperating brake drum, and thereby to force the brake-band out of contact with the drum, and each roller also having adjustable stop means to limit the degree of the resulting release.

4. In a brake-band, the combination of: two band-sections; arcuate slipping contacts between the two sections; means joining the two sections; means positively preventing, during both setting and releasing of the brake, outward buckling of the two sections at the juncture; and means distributed about the periphery of the band and supported thereby, adjustable to hold the band, when released, a uniform distance away from the operating drum.

5. In a brake-band, the combination of: two band-sections; arcuate slipping contacts between the two sections; means joining the two sections; means positively preventing, during both setting and releasing of the brake, outward buckling of the two sections at the juncture; and means distributed about the periphery of the band and supported thereby, to hold the band, when released, away from the cooperating drum.

6. In a brake-band, the combination of: two band-sections; arcuate slipping contacts between the two sections; means joining the two sections; means positively preventing, during both setting and releasing of the brake, outward buckling of the two sections at the juncture; and means distributed about the periphery of the band, to hold the band, when released, away from the cooperating drum.

7. In a brake-band, the combination of: two band-sections; linings therefor; guide means, carried by each section, shaped to conform to the opposing section; means carried by each section to constrain the guide means of the other section to maintain an arcuate path during both setting and releasing of the brake; and means for adjusting the gap between the two sections.

8. In a brake-band, the combination of: two band-sections; arcuate slipping contacts between the two sections; and means to positively hold the two sections in the same circular arc in the vicinity of the juncture during both setting and releasing of the brake.

9. In a brake-band, the combination of: two band-sections; arcuate slipping contacts between the two sections; adjustable means joining the two sections; and means positively preventing, during both setting and releasing of the brake, outward buckling of the two sections at the juncture.

MITCHELL L. FYKSE.